United States Patent [19]

Seki et al.

[11] 4,297,028
[45] Oct. 27, 1981

[54] MULTI-ITEM DATA INPUT APPARATUS
[75] Inventors: Yashiro Seki; Hideo Kobayashi; Kiyoshi Kimura; Masayuki Naito, all of Tokyo, Japan
[73] Assignee: Anritsu Electric Company Limited, Tokyo, Japan
[21] Appl. No.: 141,182
[22] Filed: Apr. 17, 1980
[30] Foreign Application Priority Data Jun. 21, 1979 [JP] Japan ................... 54-78295

[51] Int. Cl.³ ............. G03B 27/52; G03B 23/02
[52] U.S. Cl. .............................. 355/41; 353/25
[58] Field of Search ............. 355/40, 41; 354/7, 11, 354/15; 353/25

[56] References Cited
U.S. PATENT DOCUMENTS 3,288,025  11/1966  Litz et al. ........................ 355/41
3,594,080   7/1971  McMillin ......................... 355/41
3,679,304   7/1972  Eng ................................. 355/41
3,751,006   8/1973  Craig .............................. 355/40
3,771,863  11/1973  Muka .............................. 355/40

Primary Examiner—Monroe H. Hayes
Attorney, Agent, or Firm—Holman & Stern

[57] ABSTRACT

A multi-item data input apparatus for manual generation of data to designate selected ones of a plurality of items comprises lists of items visibly written in matrix array form on a number of sheets, with the sheets being rolled around a cylindrical holder in successively overlapping relationship. Means are provided for unrolling a selected one of the sheets such as to position the corresponding item array below a keyboard having a transparent key above each item. Actuation of a key causes an electrical signal designating the corresponding item to be generated.

17 Claims, 15 Drawing Figures

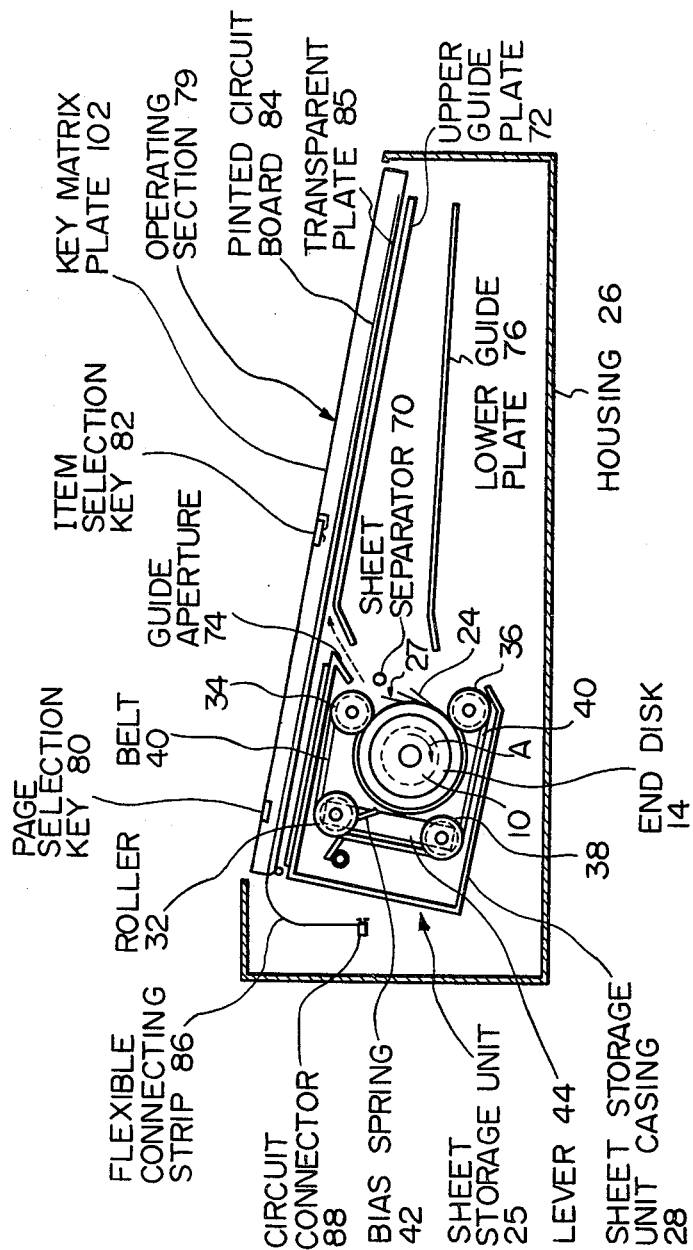

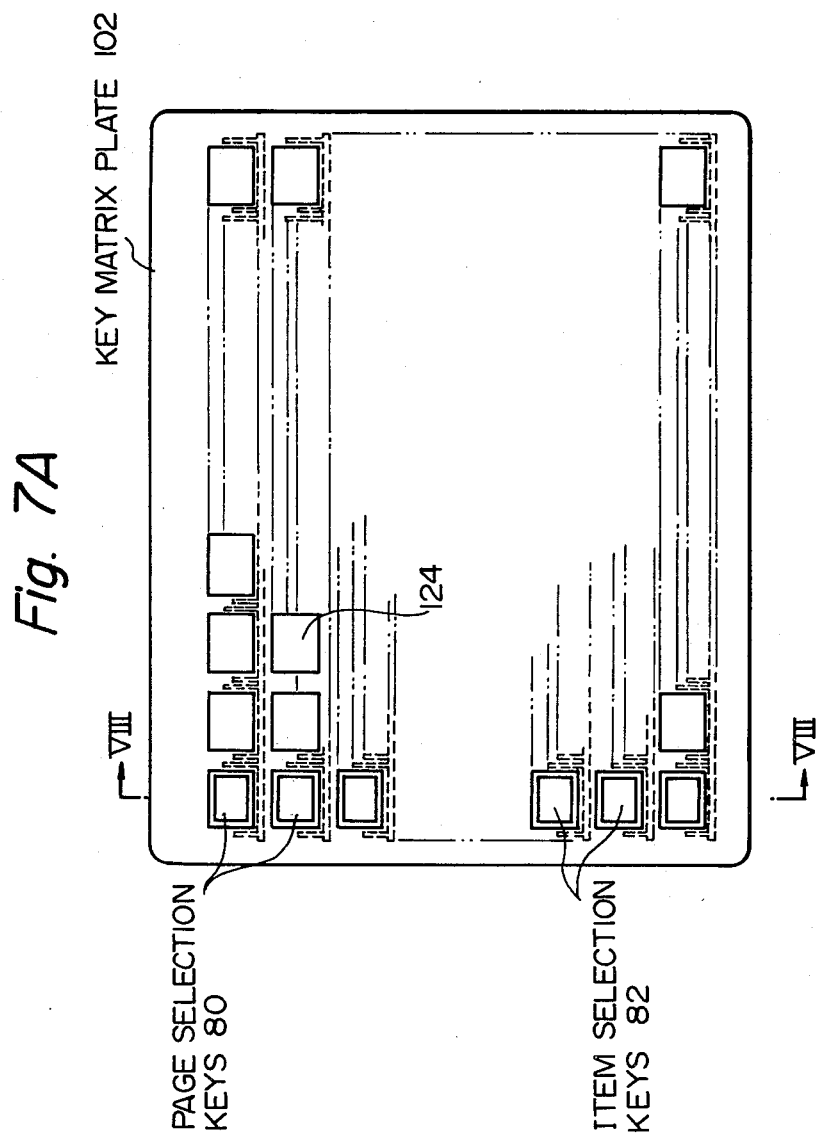

TRANSPARENT PLATE
85

CONDUCTIVE PATTERN
104

MULTI-ITEM DATA INPUT APPARATUS

BACKGROUND OF THE INVENTION

There are various applications in which it is necessary to be able to rapidly select particular items from a large number of other items, and to generate data which specifies a selected item, for input to an electronic data-processing system for example. When this item selection must be performed manually, i.e. by an operator actuating keys on a keyboard, or some other device, an excessive amount of time may be required, using conventional methods of item selection. One method which has been utilized to facilitate such item selection has been an item list in the form of a number of pages bound together like a book. Each page is perforated with an array of apertures, with an item appearing beside each aperture. In order to select a particular item, the page on which the item should appear is first looked-up. This page is then placed over a device having a set of keys each corresponding in position to an aperture on the page. The operator can then generate an electrical signal corresponding to the selected item by actuating the appropriate key. Alternatively, instead of an array of keys, an array of photoelectric elements may be employed, each corresponding in position to an aperture on the page. The operator in this case can generate an electrical signal specifying a particular item by applying a device such as a light pen to the appropriate aperture in the page.

Another method which has been employed in the prior art to rapidly specify selected items has been to use a single long rolled sheet, rather than a number of pages, with the array of perforations and the corresponding items thereon. The rolled sheet is wound around two rollers which are spaced apart, and pass beneath a transparent plate having an array of switches provided on its upper side. A motor can be actuated by the operator to drive the shafts such as to move the sheet until the desired item appears below the transparent plate. By actuating a corresponding switch, the operator can now generate an electrical signal designating the desired item.

The first of the methods described above, in which a number of pages are used bound in the form of a book, has the disadvantage that a large amount of time is required for the operator to look-up the appropriate page manually, then set the page in position for selection of the desired item. The second of the methods described above, in which a single long sheet is used in rolled form, has the disadvantage of a long look-up time, i.e. it may be necessary to unroll a large portion of the sheet in order to place a desired item below the selection switches. In addition, replacement of the sheet rolls will be difficult and time-consuming.

With the present invention, the disadvantages of prior art methods of looking up and selecting particular items, in order to generate a corresponding electrical signal, are overcome. The various items to be selected are provided on a number of pages. However, an appropriate page can be immediately selected by the operator actuating a corresponding page selection key on a keyboard. In this way, the long look-up time of a system employing a single long rolled sheet is avoided, while the time involved in manual look-up of a number of pages is also eliminated.

SUMMARY OF THE INVENTION

In the present invention, a number of sheets are rolled around a sheet holder, which is provided with an axial shaft having end disks mounted at its ends, between which the various sheets are held. The sheets are rolled around the sheet holder in a successively overlapping relationship. The sheet holder can be selectively rotated in the same direction as that in which the sheets are rolled, or in the opposite direction, by means of a stepping motor. Guide means are provided, whereby a single sheet can be unrolled from the sheet holder when the stepping motor is first rotated in one direction and then in the other, causing the selected sheet to be deposited upon a supporting plate. A matrix array of items to be selected, called a page, is provided on each of the sheets, and a keyboard having transparent keys is provided above the selected sheet such that each item on the sheet is visible through a corresponding key. A matrix of conductors, consisting of two sets of conductors at right angles to one another, is provided below the keyboard in such a way as not to obstruct visibility of the items on the selected sheet. Actuation of a key causes contact to be established at a corresponding intersection of the conductor matrix, causing data designating the selected item to be generated. Other transparent keys, for page selection, are provided above another part of the conductor matrix, and a list specifying the various pages is provided beneath these page selection keys. Actuation of a page selection key causes corresponding data to be generated, which is applied to a control circuit. A disk having a plurality of apertures, each corresponding to one of the sheets on the sheet holder, is mounted on the stepping motor shaft, and electro-optical means are provided for generating, in conjunction with this disk, signals indicating the angular position of the stepping motor shaft (and hence of the sheet holder). These position signals are also input to the control circuit. The control circuit processes the position signals in conjunction with the page selection data input from the page selection keys, to produce output signals that drive the stepping motor in such a way that the selected page is unrolled from the sheet holder to be positioned below the item selection keys.

Means are further provided whereby a sheet holder can be immediately removed and replaced with another. The list which specifies the various pages on a sheet holder is provided on a casing which is attached to the sheet holder, and is thus also replaced when replacement of a sheet holder is performed.

BRIEF DESCRIPTION OF THE DRAWINGS

In the drawings:

FIG. 2A is a partial cross-sectional view of a preferred embodiment of a multi-item data input apparatus according to the present invention, showing a condition in which all of the flexible sheets are rolled around the sheet holder;

FIG. 7A is a partial view in plan of operating section of the preferred embodiment;

DESCRIPTION OF THE PREFERRED EMBODIMENT

Figure 1A:
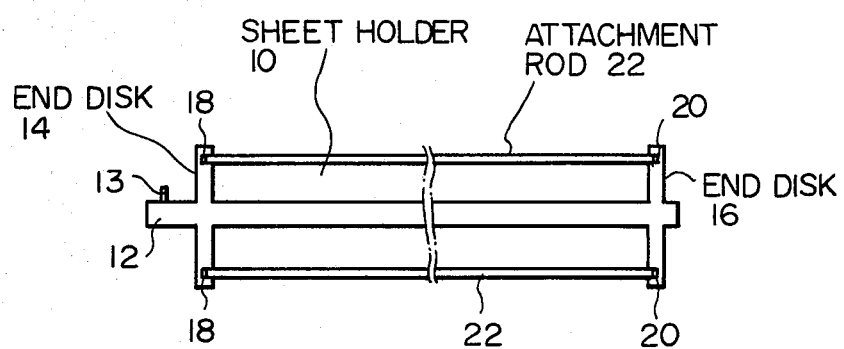
FIG. 1A is a cross-sectional partial view in elevation of a sheet holder according to the present invention.
Figure 1B:
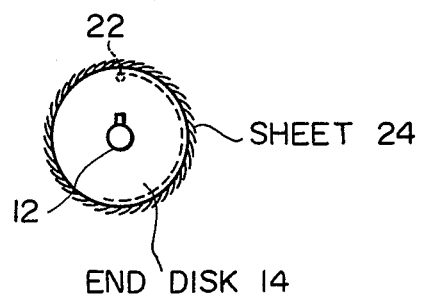
FIG. 1B is an axial view of the sheet holder of FIG. 1A, illustrating the manner in which flexible sheets are rolled around the sheet holder in a successively overlapping manner.

Referring now to FIG. 1A, a partial cross-sectional view of a sheet holder used in a preferred embodiment of a multi-item data input apparatus according to the present invention is shown. This is comprised of an axial shaft 12 having two end disks 14 and 16 integrally mounted thereon as shown. A number of identical recesses are formed on the inner faces of each of end disks 14 and 16. Numeral 22 denotes an attachment rod, comprising a thin rod of relatively strong material, which is attached to one end of a flexible sheet and is retained in sheet holder 10 by being held in opposing recesses 19 and 21 in end disks 14 and 16. An attachment rod may be retained between end disks 14 and 16 by being first positioned between the apertures 18 and 20 in a slightly bent condition, and then released. Reference numeral 13 denotes a coupling pin provided on shaft 13 for drive purposes, as described hereinafter. FIG. 1B is an end view of the sheet holder 10 as seen from the end on which coupling pin 13 is provided, and illustrates the manner in which a number of flexible sheets 24 are each rolled around sheet holder 10 in a successively overlapping relationship. The rolled shape of one of the flexible sheets 24 is indicated by a borken line, while only the overlapping outer ends of the remainder of flexible sheets 24 are indicated around the periphery of sheet holder 10. Each of the flexible sheets 24 is attached to sheet holder 10, which is engaged in opposing recesses 18 and 20 as shown in FIG. 1A.

Upon each of the flexible sheets 24, a number of items are written in visible form, in the configuration of a matrix array. Such a set of items on one of flexible sheets 24 will be referred to hereinafter as a page.

Figure 2B:
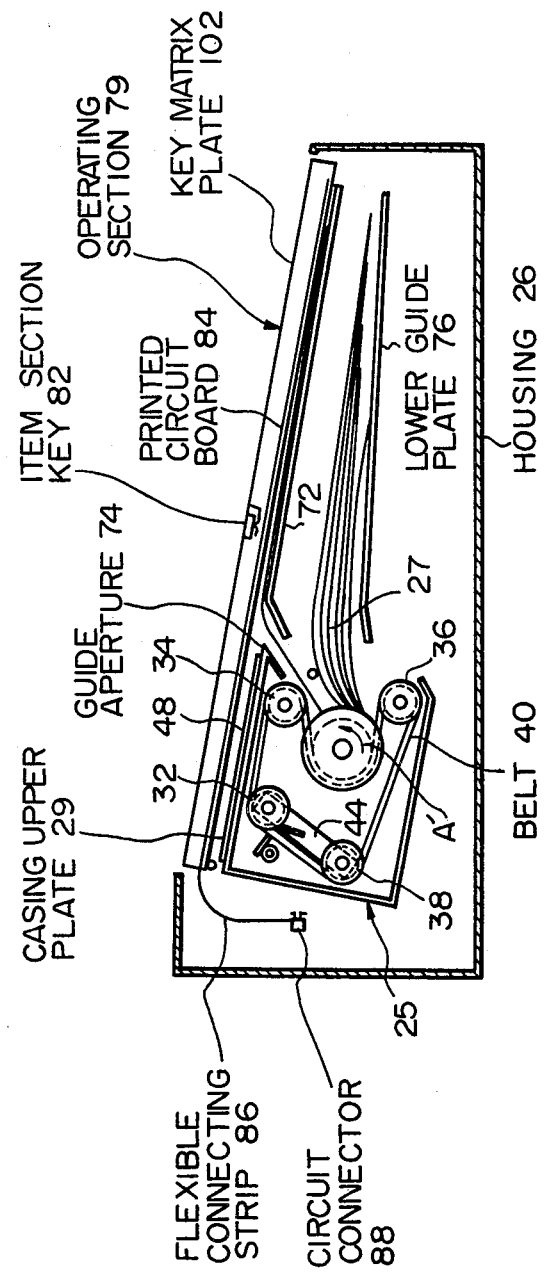
FIG. 2B is a partial cross-sectional view of the multi-item data input apparatus of FIG. 1A, illustrating a condition in which one of the flexible sheets has been selected and unrolled to be positioned beneath an array of item selection keys.

Referring now to FIG. 2A, a cross-sectional side view in elevation of a preferred embodiment of the present invention is shown. FIG. 2A and the accompanying drawing of FIG. 2B, have been simplified, for clarity of explanation of the operation of the embodiment. Sheet holder 10 is not handled as an independent component, but as part of a sub-assembly which is designated as sheet storage unit 25 in FIG. 2A. Sheet storage unit 25 consists of an outer supporting casing, designated as sheet storage unit casing 28, which is basically in the form of an oblong box which is open at one side (i.e. the right side in FIG. 2A and 2B). Three rollers, denoted as 32, 34 and 36, are mounted rotatably on elongated supporting members (not shown in FIG. 2A), which are mounted in the side walls of sheet storage unit casing 28. A fourth roller 38 is rotatably mounted on a lever 44 which is mounted at one end on the elongated support of roller 32, and is free to swing about the axis thereof. An endless belt 40 is passed over rollers 32 to 38, in such a way that a portion of belt 40 which passes between rollers 34 and 36 also passes around a major portion of the periphery of sheet holder 10 with flexible sheets 24 rolled theron, thereby supporting the flexible sheets 24 in the rolled condition. A bias spring 42 is mounted on the supporting member of roller 32, and urges lever 44 in the clockwise direction (as seen in FIG. 2A) to thereby apply tension to belt 40. The opposing ends of shaft 12 of sheet holder 10 are rotatably mounted in the end walls (not shown in the figures) of sheet storage unit casing 28. The end of shaft 12 upon which coupling pin 13 is mounted protrudes through the corresponding end wall of sheet storage unit casing 28. A flat plate, designated as page information plate 48, is mounted on the upper wall of sheet storage unit casing 28. Page information plate 48 carries a list designating the various pages which are stored on sheet storage unit 10.

The page designating items of this list can comprise, for example, page numbers or the categories of items stored on the pages. The page designating items are written in visible form on the page information plate 48.

Figure 3:
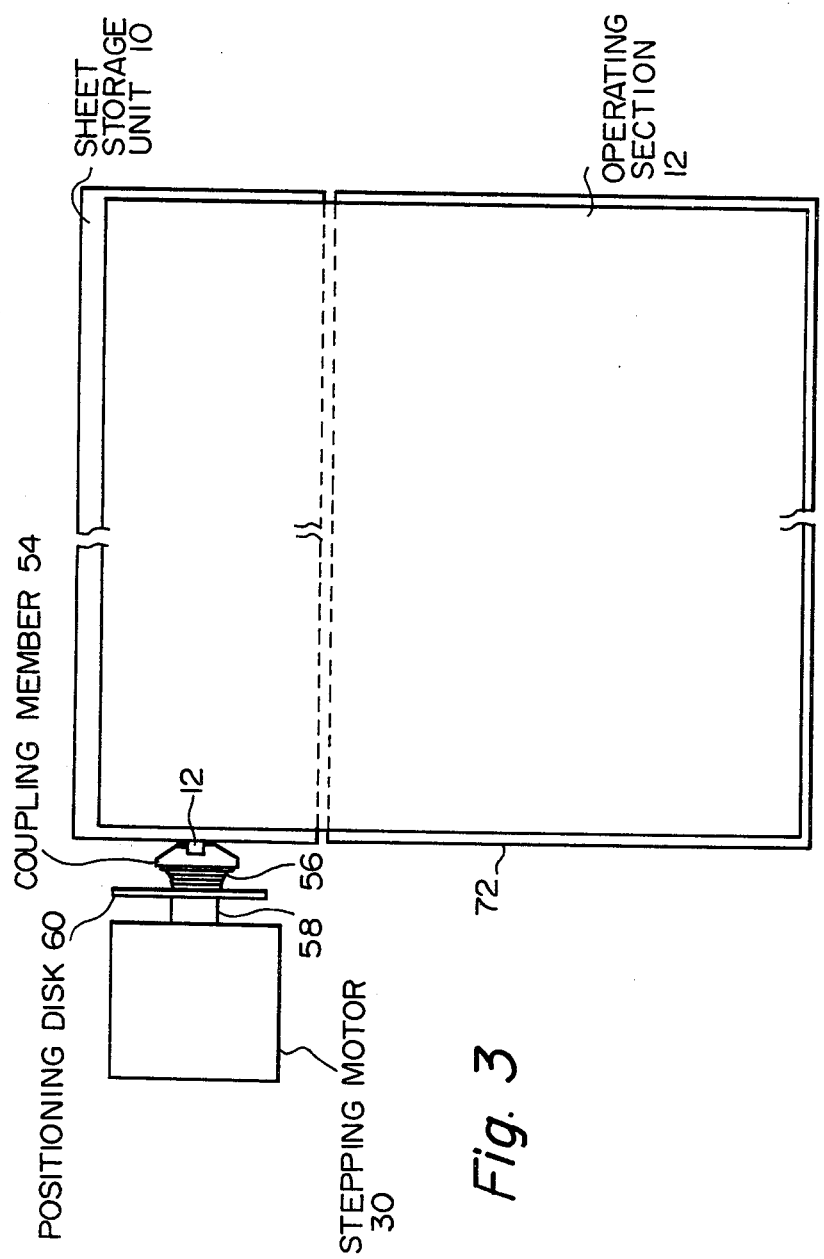
FIG. 3 is a partial plan view of the preferred embodiment.
Figure 4:
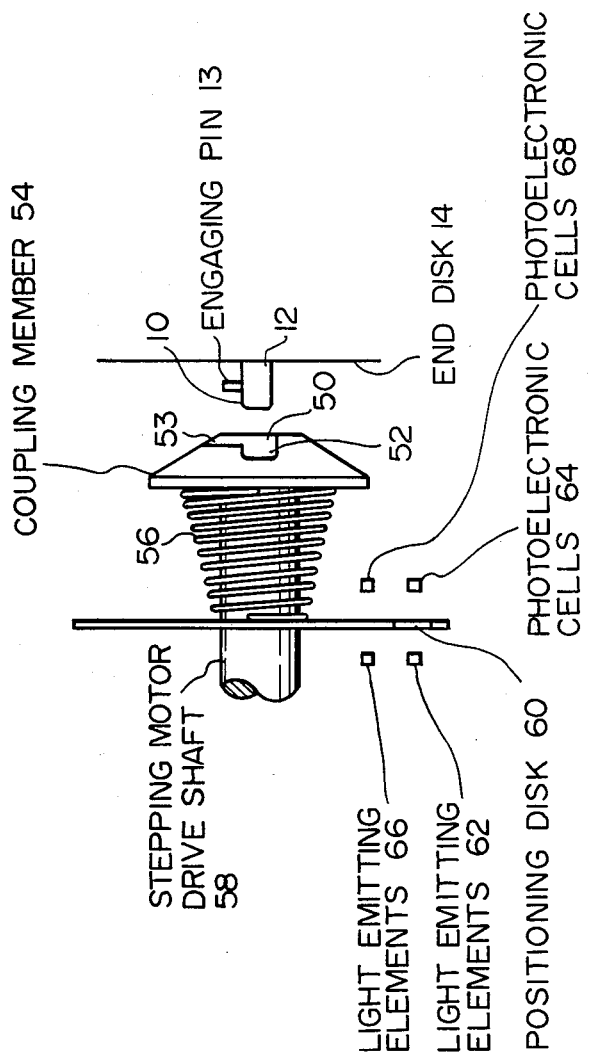
FIG. 4 is a partial view in elevation of the preferred embodiment showing the means of coupling between the stepping motor shaft and the sheet holder.
Figure 5:
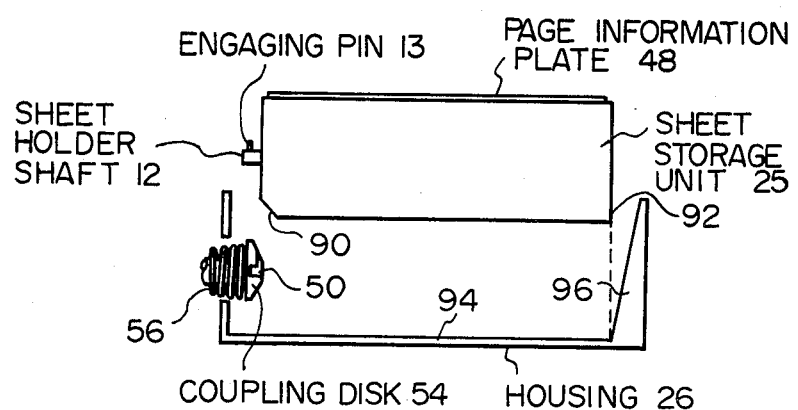
FIG. 5 is a partial view in front elevation of the preferred embodiment, illustrating the insertion of a sheet holder into the housing.

As stated above, the sheet storage unit 25 is handled as a single unit. The method of inserting and removing sheet storage unit 25 will now be described. It should first be noted that an operating unit 79, which will be described hereinafter, can be swung upward about its left hand end (as viewed in FIG. 2A) so that sheet storage unit 25 can be removed in an upward direction. First, referring to FIG. 3, a simplified plan view is given which illustrates the relationships between the sheet storage unit 25, the operating section 12, and a stepping motor 30 which rotates sheet holder 10. A coupling member 54, which has a frustro-conical shape, is free to move axially along a shaft 58 of stepping motor 30, toward stepping motor 30, against an opposing force exerted by a spring 56 which is mounted on shaft 58. The end of shaft 12 of sheet holder 10 having coupling pin 13 mounted thereon engages with an aperture in coupling member 54. This is illustrated in greater detail in FIG. 4. Aperture 50 in the coupling member 54 consists of a radially directed recess 53 into which engaging pin 13 enters, and a cylindrical portion 52 into which the outer end of shaft 12 is coupled. The process of inserting or removing sheet storage unit 25 is illustrated by FIG. 5, which is a partial and simplified cross-sectional frontal view of the preferred embodiment with sheet storage unit 10 positioned ready to be inserted into housing 26. As shown, one of the walls of housing 26, denoted as 96, is slanted outward, while a lower corner of the sheet storage unit 25 is bevelled. As the sheet storage unit 25 is lowered into housing 26, the leftmost wall of sheet storage unit 25 is enabled to move smoothly past the frustro-conical contour of coupling member 54, which is then contacted by the leftmost end of shaft 12 of sheet holder 25. As the sheet storage unit 25 is pushed further downward into housing 26, the sloping wall 96 of housing 26 acting on a lower corner 92 of sheet storage unit 25 causes the leftmost end of shaft 12 to push coupling member 54 outward of housing 26, until the end of shaft 12 engages in cylindrical recess 52 in coupling member 54. In this condition, the stepping motor 30 is actuated to rotate shaft 58 slowly. Coupling member 54 is restrained against rotation about shaft 58, so that coupling member 54 is rotated until engaging pin 13 becomes engaged in radial aperture 53. Sheet holder 10 is now coupled to stepping motor 30 to be rotated thereby.

Figure 6:
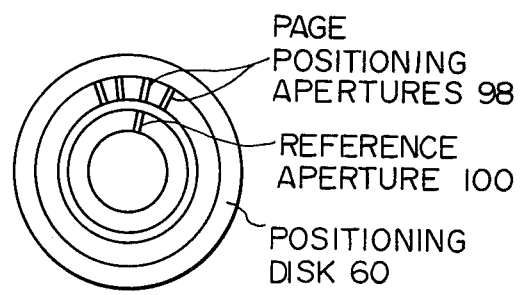
FIG. 6 is a view illustrating the construction of a positioning disk.

A flat disk, denoted as positioning disk 60, is fixedly mounted axially on shaft 58 of stepping motor 30. A plan view of positioning disk 54 is given in FIG. 6, in which it can be seen that a number of apertures 98, designated as page positioning apertures, are provided therein. There is a constant pitch between page positioning apertures 98, which are arranged at a common radial distance from the axis of positioning disk 60. The number of page positioning apertures is equal to the number of pages, i.e. to the number of flexible sheets 24 provided on sheet holder 10. A single aperture, designated as reference aperture 100, is provided at a radial distance from the axis of positioning disk 60 which is different from that of page positioning apertures 98. Light emitting elements 62 and 66 are positioned adjacent to positioning disk 60, for transmitting light through successive apertures of page positioning apertures 98 and through reference aperture 100, respectively, as positioning disk 60 rotates. The light thus transmitted impinges upon a photoelectric cell 64, from page positioning apertures 98, and on a photoelectric cell 68 from reference aperture 100. Thus, when reference aperture 100 passes between light emitting element 66 and photoelectric cell 100, an electrical pulse is generated therefrom, to indicate that positioning disk 60 is at a reference angular position. Similarly, pulses are generated by photoelectric cell 64 which indicate the relationships between the positions of the various flexible sheets 24, i.e. the various pages, and the reference angular position. The signals thus produced by photoelectric cells 64 and 68 are processed by a control circuit, and utilized to control the rotation of stepping motor 30, as will be described hereinafter.

The manner in which a single one of flexible sheets 24 is selected will now be described, referring again to FIG. 2A and to FIG. 2B. The operating section 79 includes a keyboard having one section containing a number of page selection keys, denoted in FIG. 2A by reference number 80. Each of the page selection keys is transparent, and is positioned immediately above a corresponding one of the page designations appearing on page information plate 48. In order to select a desired page, the operator actuates the page selection key positioned above the corresponding page designation. A matrix of conductors and contacts is provided below the page selection keys, and actuation of key 80 causes data to be generated by the conductor matrix which designate the selected page. These data are applied to the control circuit referred to hereinabove, and are processed in a manner which is described hereinafter. As a result of this processing, the control circuit causes stepping motor 30 to rotate in the opposite direction to that in which the flexible sheets 24 are rolled on sheet holder 10. This rotation is continued until the flexible sheet having the selected page is positioned as indicated by reference numeral 27 in FIG. 2A. A sheet separator 70, consisting of a thin rod (viewed from an axial direction in FIG. 2A) is mounted with its ends attached to side walls of housing 26. The outer edge of sheet storage unit casing 28 is curved inward toward sheet holder 10, as shown. A flat plate, designated as upper guide plate 72, is positioned below the operating unit 79, and parallel thereto. One edge of upper guide plate 72 is bent downward, toward sheet holder 10, as shown, so that an aperture with shaped edges is provided between upper guide plate 72 and the top portion of sheet storage unit casing 28, this aperture being denoted as guide aperture 74. When sheet holder 10 has been rotated in the direction described above (the clockwise direction, as viewed in FIG. 2A) until the selected sheet is in the position indicated by numeral 27, the control circuit then causes the direction of rotation of stepping motor 30 to be reversed. As a result, sheet holder 10 is now rotated in the same direction as that in which sheets 24 are rolled thereon (i.e. the counterclockwise direction as viewed in FIG. 2A). The effect of this rotation is to move the selected sheet from the position indicated by numeral 27, past the upper part of sheet separator 70, and into guide aperture 74. Then, due to the shaped edges of guide aperture 74, the selected sheet enters a space provided between the top face of upper guide plate 72 and the lower face of operating section 12. At the same time, the remaining sheets of flexible sheets 24 are transferred to the upper face of a second flat plate, denoted as lower guide plate 76, as the sheets are unrolled from sheet holder 10. The final position of the selected sheet and the remaining number of flexible sheets 24 is shown in FIG. 2B. It should be noted that upper guide plate 72 and lower guide plate 76 are rigidly attached to side walls of housing 26, although the attachment means have been omitted from the drawings, for reasons of clarity.

The selected one of flexible sheets 24 is now disposed on upper guide plate 72, beneath a portion of operating section 79 containing a number of item selection keys. The item selection keys, denoted by reference numeral 82, are transparent. As in the case of the page selection keys, a matrix of conductors and contacts is provide below the item selection keys, whereby electrical signals are generated when a corresponding key is actuated. Each item selection key is positioned above a corresponding item on the selected page which is disposed on upper guide plate 72, so that the item is visible through the key.

In order to enable operating section 79 to be swung upward about its leftmost end, as seen in FIG. 2A, a thin and flexible printed circuit board 84 is provided to establish connection between the control circuit and the matrix of conductors provided below the item selection keys and page selection keys. An extension of this printed circuit board 84, which enables this movement of the operating section, is denoted as flexible connecting strip 86, and establishes electrical connections with a circuit connector 88, which is fixed in a stationary position. Connecting leads from circuit connector 88 (not shown in the drawings) transfer the data generated by actuation of the page selection keys and item selection keys to the control circuit and to external equipment, respectively.

Thus, by actuating the appropriate one of the item selection keys, the operator can generate data designating that item, which is transferred to an external device such as data-processing equipment. When it is subsequently desired to designate an item which is stored on some other page, then the operator actuates the corresponding page selection key. The data thus generated causes the control circuit to drive stepping motor 30 in a clockwise direction, so that all of flexible sheets 84 are again rolled around sheet holder 10. This clockwise rotation (as seen in FIG. 2A and 2B) is continued until the next page to be selected is positioned adjacent to sheet separator 70, as indicated by numeral 27 in FIG. 2A. Stepping motor 30 is then automatically driven in the opposite direction, to unroll the selected sheet onto upper guide plate 72 and the remaining sheets onto lower guide plate 76, as shown in FIG. 2.

From the above description, it will be apparent that the present invention combines the rapidity of access provided by the storage of sets of data items on physically separate pages with the convenience and ease of item selection which characterizes storage on a rolled sheet that can be unrolled automatically by means of a motor drive.

Figure 7B:
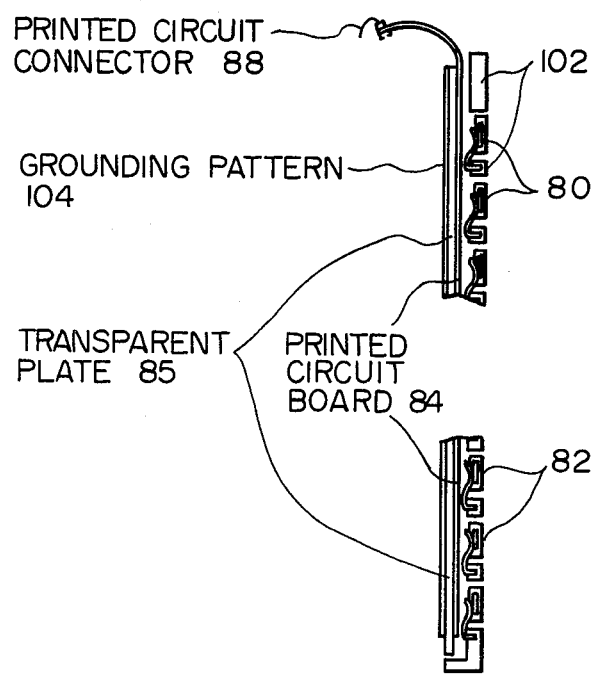
FIG. 7B is a partial cross-sectional view of the operating section of FIG. 7A.

A more detailed description of the various component parts of the preferred embodiment will now be given, referring first to FIGS. 7A, 7B, 8 and 9. FIG. 7B is a partial plan view of a key matrix plate 102 on control section 79, which retains page selection keys 80 and item selection keys 82. As indicated in FIGS. 2A and 2B, key matrix plate 102 is positioned above printed circuit board 84 and is disposed parallel thereto. Key matrix plate 102 comprises a number of rows and columns which intersect to form apertures, into each of which one of the page selection keys 80 or item selection keys 82 is retained in such a way as to be movable up and down with respect to the key matrix plate 102, within a limited range. A typical one of these apertures is denoted by reference numeral 124 in FIG. 7B.

Figure 8:
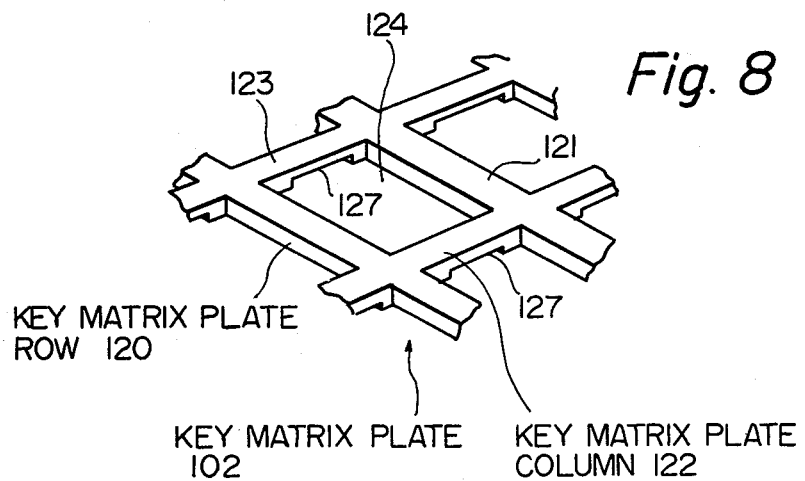
FIG. 8 is a partial detail view of the construction of a lattice portion of the matrix plate in the operating section of FIG. 7.

FIG. 8 is a partial view illustrating the manner in which aperture 124 is formed in key matrix plate 102, by the intersections of two members which are horizontal (as viewed in FIG. 7) and are designated as key matrix plate rows 120 and 122, and two members which are arranged at right angles thereto, and are designated as key matrix plate columns 122 and 123. A recess denoted by reference numeral 127, is provided below each of the portions of a key matrix plate column which forms part of an aperture.

Referring now to FIG. 7, the arrangement of a typical one of the page selection keys 80 or item selection keys 82, denoted by reference numeral 112, is shown. Key 112 fits into an aperture such as aperture 124 of FIG. 8. An extending portion is provided on each side of key 112, denoted by reference numerals 114 and 115 respectively. Side extension 114 protrudes into recess 127 of key matrix plate column 122, while side extension 115 protrudes into recess 127 of key matrix plate column 123, thereby retaining key 112 with respect to movement in an upward direction with respect to key matrix plate 102. Numerals 110 and 112 denote two typical conductor strips which form part of a set of such conductor strips arranged in the row direction (i.e. horizontally with respect to the key matrix plate 102 of FIG. 7A). Each of these conductor strips is retained within a corresponding recess provided in one of the key matrix plate rows (not shown in the figures), and is fixedly mounted therein. Thus, conductor strip 110 is mounted in key matrix plate row 120, while conductor strip 111 is mounted in key matrix plate row 121, for example. Numerals 107 and 108 denoted two conducting tracks formed on printed circuit board 84. A number of such tracks, which are designated as key contact tracks, are arranged in the column direction, i.e. at right angles to the conductor strips such as 110 and 111. A number of springs are attached at one end of each to the conducting strips. Certain ones of these springs, such as are denoted by numerals 118 and 119 in FIG. 9, serve to support and restrain the keys against inward movement, and are designated as key support springs. Other springs also serve to establish contact with a corresponding key contact track when a key is depressed, and are designated as key contact springs. Two of these are designated by numerals 116 and 118 in FIG. 9. A portion of each key contact spring is in contact with a side extension of a corresponding key, so that the key contact spring is pushed downward when the key is actuated, e.g. key contact spring 117 is pushed into contact with key contact track 108 by side extension 114 of key 112 when key 112 is actuated; thereby establishing contact between conductor strip 110 and key contact track 108. In addition, the key contact springs perform a supporting and restraining function for each key. Thus, for example, key 112 is supported by key contact spring 117 acting on side extension 114 and by key support spring 119 acting on side extension 115, which urge side extensions 114 and 115 upward against the lower faces of recesses 127 in key matrix plate columns 122 and 123 respectively.

A portion of each of the key contact tracks situated below each of the key contact springs is widened, to form a key contact pad, to ensure satisfactor contact with the key contact springs. In order to simplify FIG. 9 as far as possible, such key contact pads have been omitted therefrom.

FIG. 7B is a partial cross-sectional view through the operating section 79, illustrating the relationship between the various components thereof. As seen, the page selection keys 80 and the item selection keys 82 are retained within key matrix plate 102 in the manner described in the previous paragraphs, and are positioned immediately above printed circuit board 84. Printed circuit board 84 is supported by a transparent plate 85. In order to prevent a build-up of static electric charge on transparent plate 85 as a result of the flexible sheets 64 moving past that plate, a pattern consisting of a conductive layer is provided on the lower surface of the transparent plate 85, as denoted by reference numeral 104.

Figure 10:
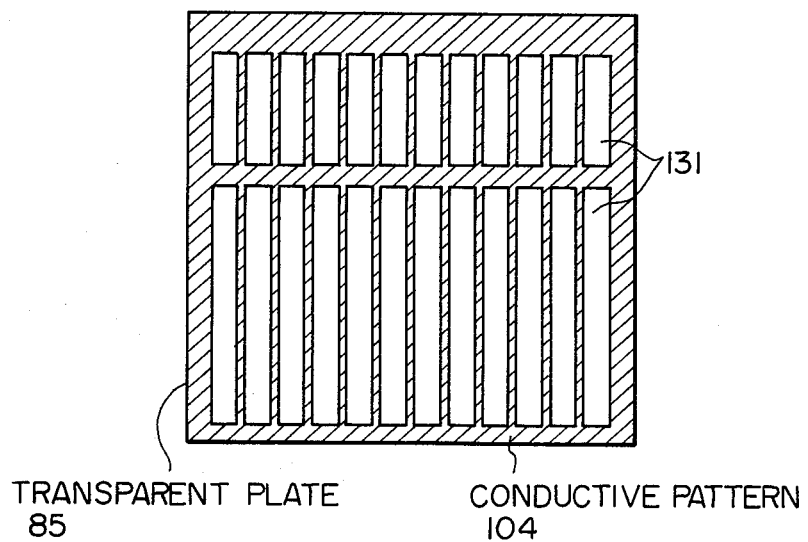
FIG. 10 is a plan view of a transparent plate in the operating section, illustrating a conductive pattern formed thereon.

The configuration of conductive pattern 104 is shown in FIG. 10, in which the conductive pattern is indicated by the hatched line area. Clear areas, as indicated by numeral 131, are provided in the pattern, to enable unimpeded visibility of the items appearing on a selected page and the page designations on the page information plate.

Figure 9:
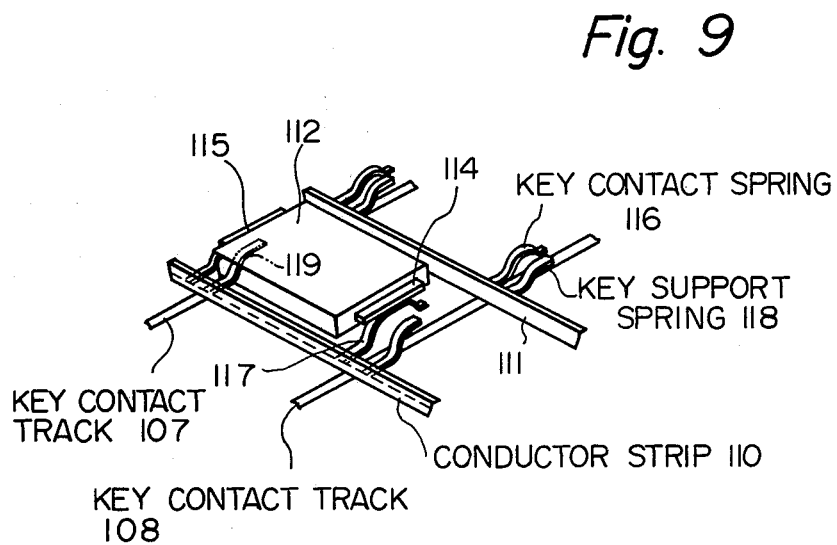
FIG. 9 is a partial view illustrating the relationship between one of the keyboard keys and a conductor matrix.
Figure 11:
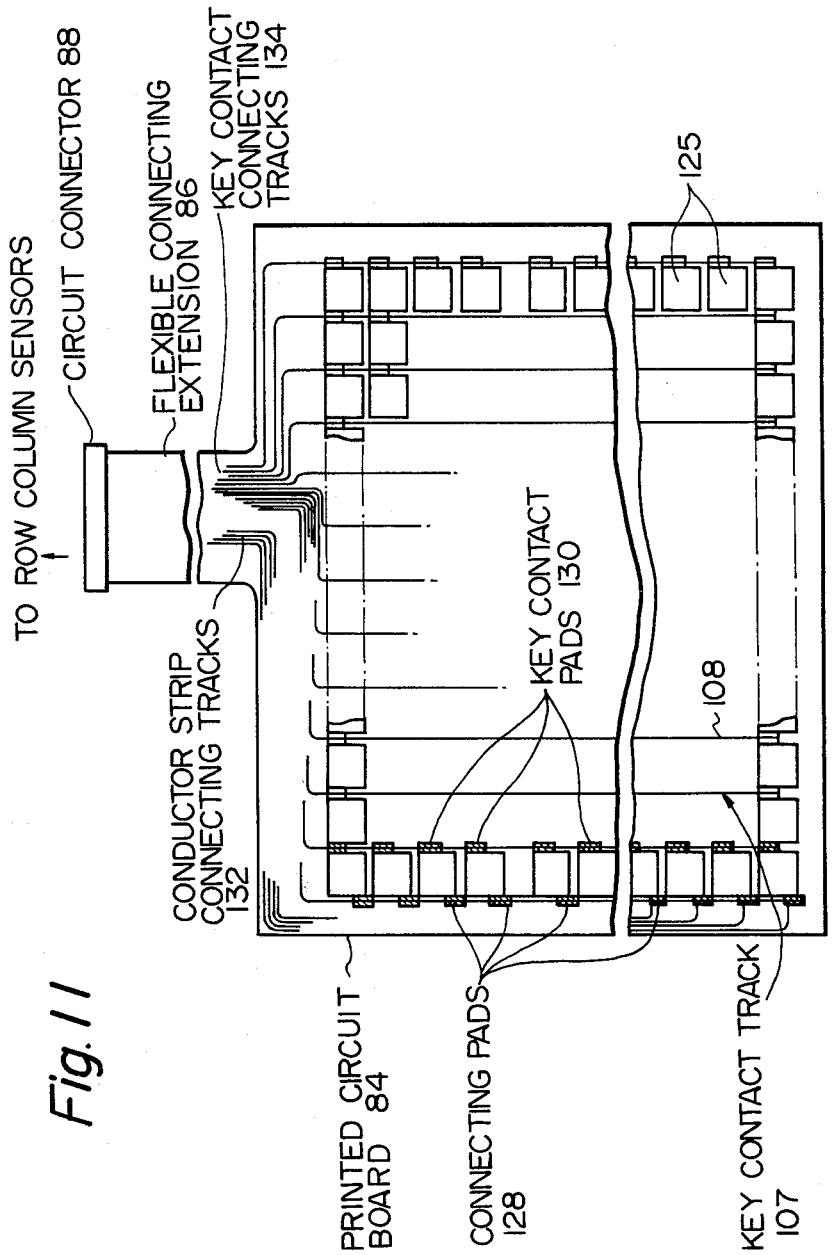
FIG. 11 is a partial plan view of a printed circuit board contained in the operating section.

FIG. 11 is a partial plan view illustrating printed circuit board 84. As shown, key contact pads denoted by reference numeral 130 are provided at positions on each of the key contact tracks located beneath corresponding key contact springs. Connection between the circuit connector 88 and the key contact tracks is established by a number of connecting tracks 134, each of which is a continuation of a corresponding key connecting track. Each of the conductor strips, such as strips 110 and 111 in FIG. 9, is connected at one end to a corresponding conductive region on printed circuit board 84, denoted as a connecting pad, as indicated by numeral 128 in FIG. 11. The connecting pads 128 are coupled to circuit connector 88 by means of a number of conducting tracks on printed circuit board 84, designated as conductor strip connecting tracks 132. In order to provide visibility of each of the page designations on page information plate 48 and the items on a selected page, a number of apertures 125 are provided in printed circuit board 84, with each of apertures 125 being positioned immediately below a corresponding one of the page selection keys 80 or the item selection keys 82.

The operation of a control circuit whereby the operation of the preferred embodiment is controlled will now be described with reference to the simplified block diagram of FIG. 12. Numeral 142 denotes a forward-/reverse pulse generation control circuit, which produces various pulses and control signals. Numeral 140 denotes a page key register, in which a number corresponding to a selected page key can be stored. A page counter 138 is a circuit which receives and counts the pulses generated from page positioning apertures 98 moving past photoelectric cell 64, as positioning disk 60 rotates. A signal produced by photoelectric cell 68, indicating detection of reference aperture 100, is applied as a reset signal to page counter 138. The counts held in page counter 138 and page key register 140 are compared by a page comparator circuit 14. Numeral 152 denotes a shift register circuit, the shift operation of which can be inhibited by a coincidence detection signal applied from page comparator circuit 148 when coincidence between the page counter and page key register contents is detected. Numerals 144 and 146 denote count registers each of which contain a preset count value. While shift register circuit 152 is performing a shifting operation in response to input pulses applied from pulse generation control circuit 142, output pulses are produced by shift register 152 and are input to a driver circuit 154. Driver circuit 152 produces drive pulses in response, which are applied to stepping motor 30. Stepping motor 30 is rotated through a predetermined angular displacement in response to each of the drive pulses, this predetermined angular displacement being equal to the angular pitch between the successively overlapping flexible sheets 24, as indicated in FIG. 1B above, i.e. to the angular pitch between the page positioning apertures 98. A forward/reverse control signal from pulse generation control circuit 142 is applied to shift register 152, and determines whether the signals output from shift register 152, and hence the drive signals applied from driver circuit 154 to stepping motor 30, will cause stepping motor 30 to rotate in the forward direction (i.e. for counter-clockwise rotation of sheet holder 10 as viewed in FIG. 1B) or in the opposite direction, which will be referred to hereinafter as the reverse direction.

The operation of the circuit of FIG. 12 will now be described. It will first be assumed that a page has been previously taken out of storage, i.e. that the corresponding flexible sheet is unrolled and is disposed on the upper guide plate 72, as indicated in FIG. 2A. If one of the page selection keys 80 is now actuated, then corresponding page selection data will be generated from operating section 79, and will be applied to pulse generation control circuit 142 and also to page key register 140. A number corresponding to the selected page is thereby stored in page key register 140. This number indicates the position of the selected page in relation to the position of reference aperture 100 on positioning disk 60. At the same time, forward/reverse control signal from control circuit 142 attains a level which designates forward rotation of stepping motor 30, and a signal is applied from pulse generation control circuit 142 to count register 146, which causes count register 146 to produce a train of pulses equal in number of the count value held therein. These pulses are applied to shift register 152, which commences a shifting operation, and at the same time produces an equal number of drive input pulses to those which are input to it from count register 146. As a result, drive pulses from driver circuit 154 cause stepping motor 30 to rotate in the forward direction until the page which was previously unrolled beneath operating section 79 is again restored to storage, i.e. until the corresponding flexible sheet is again rolled around sheet holder 10, as shown in FIG. 1B. After this point, counting by page counter 138 begins, while further pulses are input to shift register 152 from pulse generation control circuit 142 to cause further rotation of stepping motor 30 in the forward direction. When the contents of page counter 138 become equal to those of page key register 140, a coincidence detection signal is output from page comparator circuit 148, which terminates shifting operations by shift register 152. The output of drive pulses by driver circuit 154 is thereby terminated, so that rotation of stepping motor 30 ceases. At this time, the selected sheet is positioned adjacent to sheet separator 70, as illustrated in FIG. 2A. The forward/reverse control signal from pulse generation control circuit 142 then changes in level, such that subsequent drive pulses applied to stepping motor 30 will cause the motor to rotate in the reverse direction (i.e. the clockwise direction, as viewed in FIG. 1B). A signal is then applied from pulse generation control circuit 142 to count register 144, which causes a train of pulses, equal in number to a predetermined count in count register 144, to be input to shift register 152. As a result, drive pulses are successively applied to stepping motor 30 causing it to rotate in the reverse direction by an amount such that the selected flexible sheet is unrolled and passed through guide aperture 34, to be positioned beneath the operating section 79, as shown in FIG. 2B.

Figure 12:
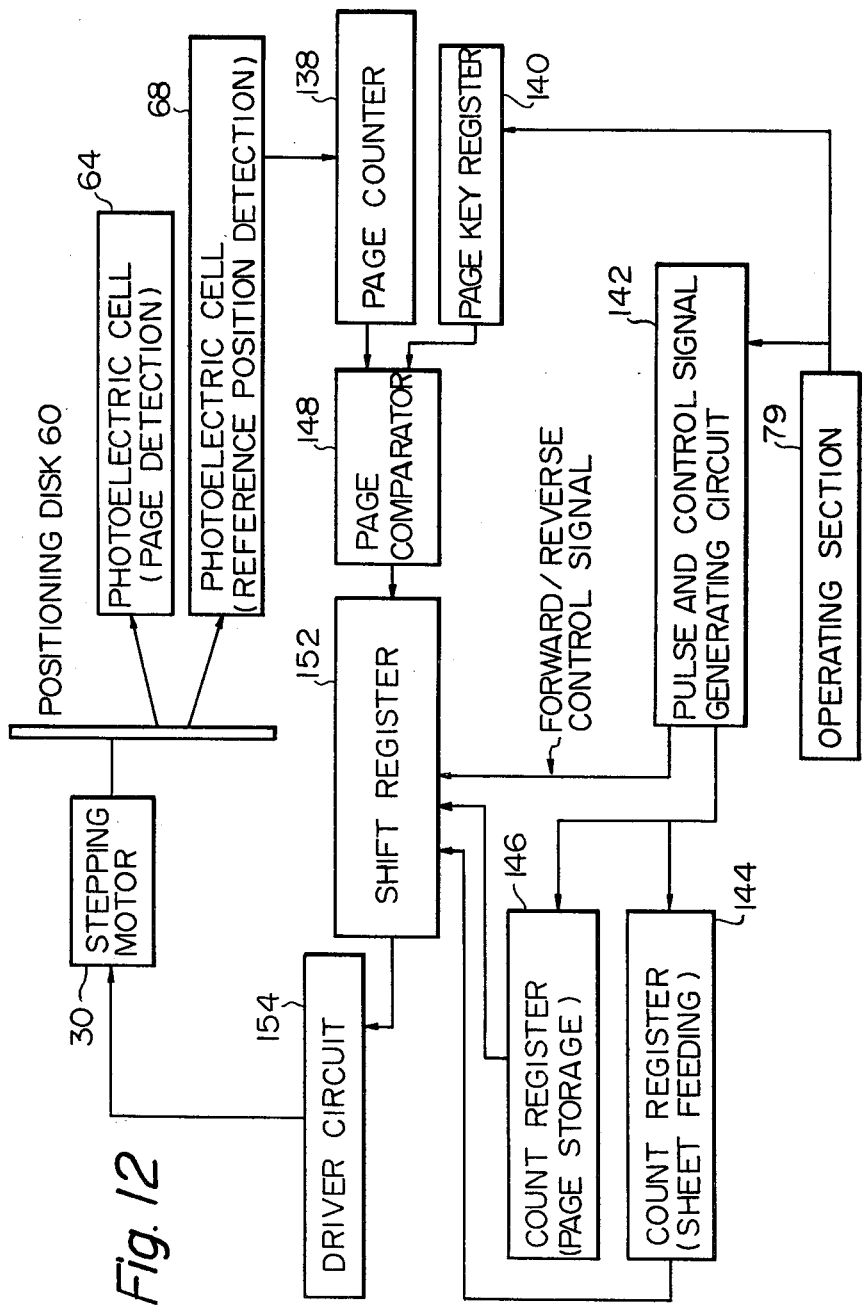
FIG. 12 is a block diagram of a control circuit for controlling the operation of the stepping motor in accordance with signals from operating section keys.

Since the various circuit blocks shown in FIG. 12 may be readily implemented by means of commonly available integrated circuits, on detailed circuit diagram corresponding to FIG. 12 is included in the present application. In addition, various other circuit arrangements other than that of FIG. 12 may be envisaged to accomplish the objectives outlined above.

From the preceding description, it will be apparent that the objectives set forth for the present invention are effectively attained. Since various changes and modifications to the above construction may be made without departing from the spirit and scope of the present invention, it is intended that all matter contained in the above description of the preferred embodiment shall be interpreted as illustrative, and not in a limiting sense. The appended claims are intended to cover all of the generic and specific features of the invention described herein.

What is claimed is:

1. A multi-item data input apparatus for manually actuated generation of data to specify selected ones of a plurality of items, comprising:
   a housing;
   a sheet holder of substantially cylindrical configuration rotatably mounted in said housing;

a plurality of flexible sheets each having a page of data appearing thereon in visible form, each of said pages comprising a plurality of said items, each of said flexible sheets being attached at one end thereof to said sheet holder, said flexible sheets being axially rolled around said sheet holder such as to successively overlap at equidistant angular intervals;

keyboard means including a plurality of page selection keys coupled to switching means for generating corresponding page selection data when each of said page selection keys is actuated and a plurality of item selection keys coupled to switching means for generating corresponding item selection data when each of said item selections keys is actuated, each of said item selection keys being transparent through at least a portion thereof, said item selection keys being arranged in positions corresponding to positions of said items on each of said pages;

guide means disposed adjacent to said sheet holder; and drive means coupled to rotate said sheet holder, being responsive to said page selection data for rotating said sheet holder in a first direction of rotation which is opposite to a direction in which said flexible sheets are rolled on said sheet holder, said rotation being continued until a selected one of said flexible sheets corresponding to a page designated by said page selection data is positioned adjacent to said guide means, said drive means then rotating said sheet holder in a second direction of rotation opposite to said first direction through a predetermined angular displacement, whereby said selected flexible sheet is directed by said guide means to be positioned in a substantially flat condition below said item selection keys, such that said items on the selected flexible sheet are visible through corresponding ones of said item selection keys.

2. A multi-item data input apparatus according to claim 1, in which said drive means comprises an electric motor having a drive shaft coupled to selectively rotate said sheet holder means in said first and second directions of rotation, opto-electric position detection means coupled to said drive shaft for generating positions indicating signals to indicate an angular position of said sheet holder means, and control circuit means responsive to said position indicating signals in conjunction with said page selection data for generating a drive signal which is applied to said electric motor, said electric motor being responsive to said drive signal for rotating said sheet holder in said first and second directions of rotation to position said selected flexible sheet below said items selection keys.

3. A multi-item data input apparatus according to claim 2, in which said electric motor comprises a stepping motor, and in which said drive signal comprises successive drive pulses.

4. A multi-item data input apparatus according to claim 3, in which each of said page selection keys is transparent in at least a portion thereof, and further comprising a page information plate consisting of a flat plate having a list of page designations visibly displayed thereon in positions corresponding to positions of said page selection keys, said page information plate being positioned behind said page selection keys such that each of said page designations is visible through a corresponding one of said page selection keys.

5. A multi-item data input apparatus according to claim 4, in which said keyboard means comprises:

a matrix plate having a plurality of apertures formed therein for movably retaining said page selection keys and said item selection keys, said apertures being defined by perpendicularly intersecting row and column members consisting of straight bars;

a plurality of row conductors comprising thin strips of a conductive material, on a corresponding one of said key matrix plate row members;

a printed circuit board disposed parallel to said matrix plate below said matrix plate and said conductive strips, having a plurality of apertures therein, each situated immediately below a corresponding one of said apertures in said matrix plate, and having a plurality of column conductors, comprising conducting tracks provided therein, each situated below a corresponding one of said column members of said matrix plate;

a plurality of contact spring members, each fixedly mounted at one end thereof on one of said conductive strips, and bearing against a corresponding one of said page selection and item selection keys for urging said key in an upward direction, each of said page selection and item selection keys being restrained in movement in said upward direction by a portion thereof bearing against a lower surface of said matrix plate, each of said contact spring members being positioned to contact a corresponding one of said column conductor conductive tracks when said key corresponding thereto is depressed, whereby electrical contact is established between said column conductor and said row conductor;

a plurality of support spring members, each fixedly mounted at one end thereof on one of said conducting strips, and bearing against a portion of a corresponding one of said item selection keys and said page selection keys for urging said key in an upward direction; and a plurality of connecting tracks comprising conductive tracks formed on said printed circuit board, each of said connecting tracks being connected to a corresponding one of said row and column conductors, for electrically connecting said row and column conductors to said control circuit means.

6. A multi-item data input apparatus according to claim 5, in which said plurality of connecting tracks are provided on a flexible extension portion of said printed circuit board, said flexible extension portion being fixedly attached at an outer end thereof to said housing.

7. A multi-item data input apparatus according to claim 6, and further comprising a transparent supporting plate provided below said printed circuit board and in contact therewith.

8. A multi-item data input apparatus according to claim 7, and further comprising a pattern of conductive material formed on a lower surface of said transparent supporting plate, for preventing a static electrical charge on said transparent supporting plate, and being arranged such as to provide unimpeded visibility through said transparent conducting plate at portions thereof situated below said page selection keys and said item selection keys.

9. A multi-item data input apparatus according to claim 7, in which keyboard means comprising said key matrix plate, said page selection keys, said item selection keys, said printed circuit board and said transparent supporting plate is movable through a predetermined angle about one end thereof from a first position disposed immediately above said selected flexible sheet to a second position, with electrical connection between said keyboard means and said control circuit means being maintained by means of said flexible extension of the printed circuit board.

10. A multi-item data input apparatus according to claim 9, and further comprising a sheet storage unit casing for containing said sheet holder rotatably supported therein, said sheet storage unit casing with said sheet holder therein being removably contained within said housing in position behind said keyboard means.

11. A multi-item data input apparatus according to claim 10, and further comprising an endless belt arranged to contact and support at least a portion of said flexible sheets on said sheet holder, said endless belt being movably mounted on a plurality of rollers within said sheet storage unit casing, said rollers being rotatably attached to said sheet storage unit casing, said sheet holder, endless belt and rollers constituting a sheet storage unit.

12. A multi-item data input apparatus according to claim 11, and further comprising coupling means including an axially compressible spring on said stepping motor drive shaft and coupling means provided on one end of a shaft of said sheet holder, arranged such that at least a portion of said sheet holder coupling means becomes engaged with said stepping motor coupling means when said sheet storage unit is inserted in said housing.

13. A multi-item data input apparatus according to claim 12, in which said page information plate is provided on a portion of said sheet storage unit casing.

14. A multi-item data input apparatus according to claim 13, wherein said guide means includes a sheet separator member comprising a rod fixedly attached at each end to said housing and aligned with the axis of rotation of said sheet holder, said sheet separator member being disposed adacent to said sheet storage unit such as to guide a single one of said flexible sheets toward an aperture formed between adjoining portions of said sheet storage unit casing and said upper supporting plate when said sheet holder unit is rotated in said first direction of rotation, so that said single one of said flexible sheets subsequently passes between said upper supporting plate and said transparent supporting plate.

15. A multi-item data input apparatus according to claim 1, in which said sheet holder comprising:
a shaft;
a first end disk integrally mounted axially on said shaft adjacent to a first end thereof, and having a plurality of recesses formed on an inner face of said first end disk with an identical pitch between adjacent ones of said recesses;
a second end disk integrally mounted axially on said shaft adjacent to a second end thereof, and having a plurality of recesses formed in an inner face of said second end disk, the latter plurality of recesses being aligned in axial opposition to said recesses in said first end disk and equal in number thereto; and
a plurality of sheet attachment rods, each having one of said flexible sheets fixedly attached thereto and mounted between said inner faces of said first and second end disks with one end thereof inserted in one of said recesses in said first end plate and the other end thereof inserted in an axially opposing recess in said inner face of said second end disk.

16. A multi-item data input apparatus according to claim 2, in which said opto-electric position detecting means comprises:
a positioning disk fixedly mounted axially on said drive shaft, said positioning disk being provided with a plurality of page positioning apertures arranged with equal angular pitch and radially equidistant from the axis of said drive shaft, the number of said positioning apertures being equal to that of said flexible pages rolled on said sheet holder, said positioning disk being further provided with a reference aperture arranged at a different radial distance to said positioning apertures from said drive shaft axis;
a first light emitting element arranged adjacent to a first side of said positioning disk for transmitting light successively through each of said page positioning apertures as said positioning disk rotates;
a second light emitting element arranged adjacent to said first side of the positioning disk, for periodically transmitting light through said reference aperture;
a first photoelectric detection element arranged adjacent to the opposite side of said positioning disk to said first side, and positioned to receive light transmitted through said page positioning apertures; and
a second photoelectric detection element arranged adjacent to said opposite side of the positioning disk, and positioned to receive light transmitted through said reference aperture;
electrical signals generated by said first and second photoelectric detection elements being applied to said control circuit means for thereby designating the angular positions of said flexible sheets on said sheet holder means in relation to said guide means.

17. A multi-item data input apparatus according to claim 3, in which said control circuit means comprises:
a page key register circuit coupled to receive said page selection data, and responsive thereto for storing a number indicative of a selected page;
a page counter circuit coupled to receive a page position signal comprising successive pulses produced as said sheet holder rotates and a reference signal comprising a pulse which is produced when said page holder attains a reference angular position, said page counter circuit being responsive to said reference signal for being set to a predetermined intial count value and being responsive to said page position signal for generating successive count values as said sheet holder rotates from said reference angular position;
page comparator circuit means for comparing the count values held in said page counter circuit and said page key register circuit, and for generating a coincidence signal when said count values become coincident;
a pulse and control signal generation circuit responsive to generation of a page selection signal for generating a forward/reverse control signal at a first logic level and producing a first plurality of consecutive pulses, and for then generating said forward/reverse control signal at a second logic level and producing a second plurality of consecutive pulses;
a shift register responsive to said first plurality of pulses from said pulse and control signal generation means and said first logic level of the forward/reverse control signal for producing a first plurality of drive input pulses, and to said second plurality of pulses from said pulse and control signal generation means with said second logic level of said forward/reverse control signal for producing a second plurality of drive input pulses, said drive input pulses being produced by said shift register only while a shifting operation thereof is being executed, said shifting operation being inhibited by said coincidence signal from said comparator circuit; and driver circuit means responsive to said first plurality of drive input pulses for producing a first plurality of drive pulses and responsive to said second plurality of drive input pulses for producing a second plurality of drive pulses;

said stepping motor being responsive to said first plurality of drive pulses for rotating said page holder in said first direction of rotation until a selected one of said flexible sheets is positioned adjacent to said guide means and coincidence is established between said counts in said page counter and page key register, and responsive to said second plurality of drive pulses for rotating said page holder through a predetermined angular displacement in said second direction of rotation in response to said second plurality of drive pulses.

* * * * *